United States Patent Office 2,924,755
Patented Feb. 9, 1960

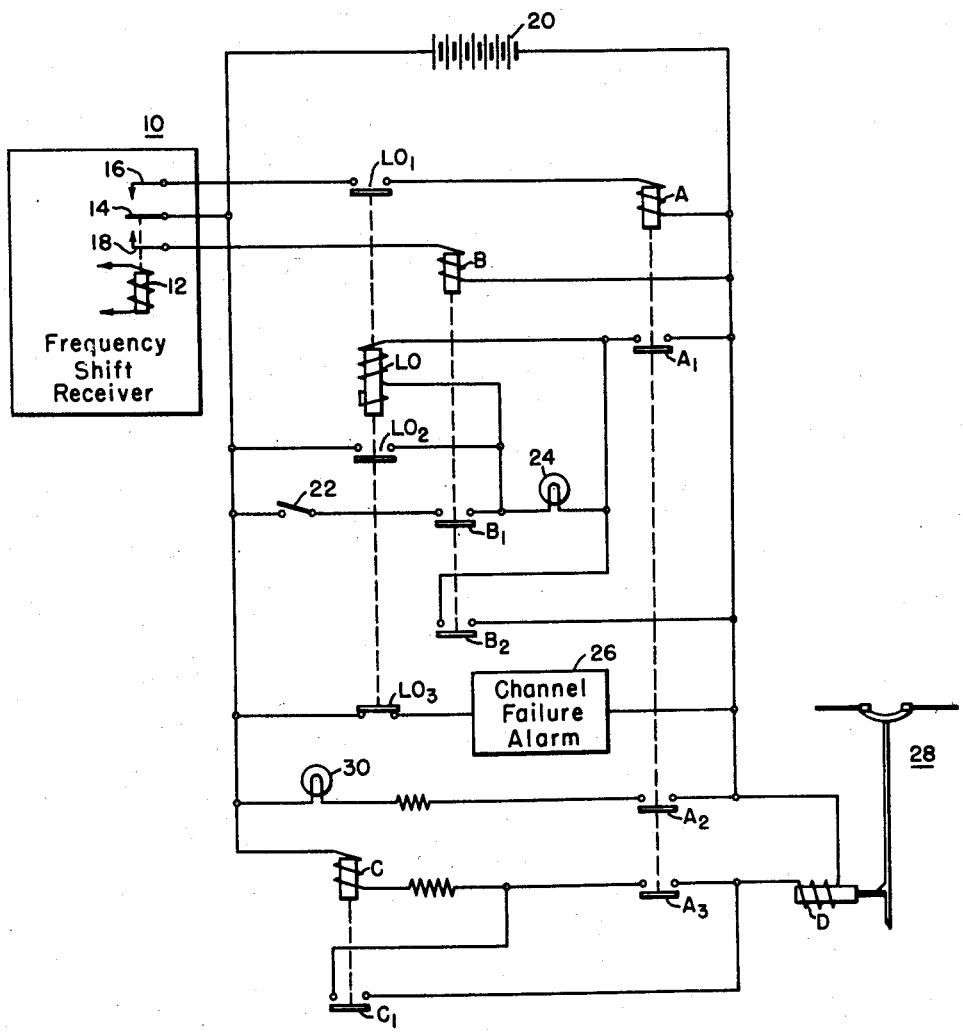

2,924,755
ELECTRICAL CONTROL SYSTEM

John C. G. Carter, Baltimore, Md., assignor to Westinghouse Electric Corporation, East Pittsburgh, Pa., a corporation of Pennsylvania Application May 3, 1955, Serial No. 505,633

2 Claims. (Cl. 317—139)

This invention relates to protective relaying systems and, more particularly, to a remote control system for a circuit breaker or other electrical device.

In installations where different parts of a complete system are separated by appreciable distances, it sometimes becomes necessary or desirable to provide for remote control of an electrical switching device or the like. In an electrical transmission system, for example, it may be necessary to open a circuit breaker at the far end of a transmission line when a fault occurs at the near end. In this case, the fault occurring at the near end of the line is ordinarily too small to actuate the fault detector relays at the far end; and, consequently, some sort of trip signal must be sent from one end of the transmission line to the other to operate the circuit breaker. This trip signal may be sent by wire line, by microwave, or by power line carrier, and because the receiving equipment for the signal is in continuous readiness and has to operate fast, it is liable to be actuated by spurious voltages due to noise, interfering signals, or distortion of some signal normally present but not intended to be a trip signal.

One common method of transmitting a trip function over a transmission system is by means of a continuous signal which shifts in frequency. Normally, the frequency is such that it operates a hold circuit and prevents tripping. When a fault occurs, the frequency shifts to one which actuates the trip circuit of the circuit breaker. This system is normally very well protected against noise or stray signals, but if the continuous signal fails or if it changes frequency slightly, it is possible to have false operation.

It is an object of my invention to provide a new and improved remote control system. More specifically, I have provided means for insuring freedom from false operation in a remote control system where there are two signals, one for hold and one for trip, where a trip function involves a sudden transition between the trip and hold signals, and where a slow transition or complete absence of signal might otherwise render the equipment subject to false tripping. The embodiment of the invention hereinafter described involves a continuous signal frequency shift system which is impervious to complete channel failure, stray signals or bursts of noise, and drifts in frequency which might otherwise cause false operation. As will become apparent from the following description, immunity to drifts in frequency is accomplished by the use of a lockout relay which prevents a trip signal from taking effect unless immediately preceded by a hold signal.

The above and other objects and features of the invention will become apparent from the following detailed description taken in connection with the accompanying single figure drawing which illustrates the invention schematically.

Referring now to the drawing, a frequency shift receiver 10 is shown in block form having a relay coil 12 operatively associated with a movable contact member 14 and a pair of fixed contact members 16 and 18. Frequency shift receivers of this type are well known in the art and are illustrated and explained, for example, in U.S. Patent No. 2,611,031, Appert, issued September 16, 1952, and U.S. Patent No. 2,502,308, Eldredge, issued August 29, 1950. For purposes of the present invention, it will be sufficient to state that when a signal of a first predetermined frequency is received by receiver 10, it will actuate relay coil 12 to cause movable contact member 14 to make with contact 18. This first frequency signal is generally called a "hold" signal, meaning that at this frequency the tripping circuits are positively held against accomplishing a trip function, and the circuit breaker (or other device to be controlled) is closed. When a signal of a second predetermined frequency, called the "trip" frequency, is received by receiver 10, relay coil 12 is actuated in the opposite sense to cause movable contact member 14 to make with contact 16. Control circuitry, hereinafter described, causes the controlled device to trip at the trip frequency.

The control circuitry shown includes two energizing coils A and B equipped with a source of suitable electrical energy, such as a battery 20. Associated with energizing coil A are three pairs of normally open contacts $A_1$, $A_2$, and $A_3$ which close when the relay coil is energized. In a similar manner, energizing coil B has two pairs of normally open contacts $B_1$ and $B_2$ which close when the coil is actuated. The energizing coils A and B are of the fast drop-out type. That is, they will release their associated contacts from closed to open position very quickly.

Also included in the control circuitry shown is a slow release lockout relay energizing coil LO having two pairs of normally open contacts $LO_1$ and $LO_2$ and a pair of normally closed contacts $LO_3$. Energizing coil LO, in contrast to coils A and B, has a slow drop-out rate and will release its contacts from the position they assume during energization very slowly with respect to the drop-out time of relays A and B.

An energizing path for coil A is provided which extends from the positive terminal of battery 20 through members 14 and 16 and the normally open contacts $LO_1$ to the negative terminal of battery 20; while an energizing path for coil B is provided through members 14 and 18. Energizing coil LO has two main energizing paths. One of these paths extends from the positive terminal of battery 20 through a manual reset switch 22, the normally open contacts $B_1$, coil LO and the normally open contacts $B_2$ to the negative terminal of battery 20. The other path extends through normally open contacts $LO_2$, the relay coil LO and the normally open contacts $A_1$. An indicator lamp 24 will light when contacts $B_1$ and $B_2$ close and, hence, will indicate an energized condition of relay coil LO.

A channel failure alarm 26, which may be a bell or other suitable signaling device, is actuated whenever coil LO is deenergized and contacts $LO_3$ close.

A circuit breaker, generally indicated at 28, has a trip coil D associated therewith. An energizing path for trip coil D extends from the positive terminal of battery 20 through a relay coil C, the normally open contacts $A_3$ and coil D to the negative terminal of battery 20. Note that contacts $A_3$ are shunted by contacts $C_1$. Consequently, once the relay coil C is energized upon closure of contacts $A_3$, its contacts $C_1$ will lock it in its energized condition regardless of the position of contacts $A_3$. A second indicator lamp 30 will light when coil A is energized and normally open contacts $A_2$ are closed, thereby indicating an energized condition of coil A.

Operation of the invention is as follows: In order to initiate operation of the control circuitry, switch 22 is closed. When a hold frequency signal is received by receiver 10, energizing coil 12 will position movable contact 14 to make with contact 18. Consequently, relay coil B will be energized and relay coil A will be deenergized during this time. The energization of coil B will close contacts $B_1$ and $B_2$ to cause energization of coil LO assuming that manual reset switch 22 is closed. Closure of contacts $B_1$ and $B_2$ also causes indicator lamp 24 to light. Once the hold frequency is initially received by the system coil LO will become energized. Consequently, manual reset switch 22 may now be opened since it is shunted by a circuit completed by contacts $LO_2$ which are closed. The channel failure alarm 26 will be deenergized at this time since contacts $LO_3$ are open.

When a trip frequency signal is received by receiver 10, coil 12 will position contact member 14 to make with contact member 16, thereby causing deenergization of relay coil B and energization of coil A. The slow release lockout relay coil LO remains closed during the shift in frequency because of its slow drop-out rate. That is, during the time required for the frequency to change from trip to hold for normal operation of the remote trip function, the LO relay coil will remain in an energized condition; contacts $LO_1$ and $LO_2$ will remain closed; and contact $LO_3$ will remain open. When relay coil A is energized, contacts $A_1$ close and hold the lockout relay coil LO in energized condition, the energizing circuit for coil LO now being provided through contacts $LO_2$ and contacts $A_1$. The energization of coil A also causes lamp 30 to light by virtue of the closure of contacts $A_2$ and energizes the trip coil D and relay coil C, thereby causing contacts $C_1$ to close.

If the received signal for receiver 10 should disappear, both relay coils A and B will become deenergized since movable contact member 14 will now be in mid position. As a result, the slow release lockout relay coil LO will drop out and will energize the channel failure alarm 26 by virtue of the closure of contacts $LO_3$. If a stray signal or a burst of noise should now occur, it may energize relay coil 12 to cause contact 14 to make with contact 16 or 18. This event may cause energization of relay coil A or B, but there is no way of energizing relay coil LO since contacts $LO_2$ and manual reset switch 22 are open.

If the received signal from receiver 10 does not completely fail, but the received frequency drifts from hold value to trip value, the drift is slower than the dropout rate of coil LO so that contacts $B_1$, $B_2$, and $LO_2$ will open before contacts $A_1$ will close. Thus, relay coil LO becomes deenergized and cannot be closed again except by closure of reset switch 22. If an automatic reset is desired, the manual reset switch 22 may be replaced by a permanent connection.

Since contacts $B_1$ are connected in series with manual reset switch 22 in the present embodiment, the lockout relay coil LO cannot be reset while the frequency has drifted to trip value. That is, before coil LO can be energized, the received frequency must be at the hold value so that movable contact member 14 makes with contact 18 to cause energization of coil B and closure of contact $B_1$.

It can thus be seen that I have provided a remote control system having trip and hold signals, where a trip function involves a sudden transition from the hold signal to the trip signal and where a slow transition between the signals or a complete absence of signals will prevent false operation of the system.

Although I have described my invention in connection with a certain specific embodiment, it will be apparent to those skilled in the art that certain changes in arrangement of parts can be made to suit the user without departing from the spirit and scope of the invention. For example, another embodiment of the invention might include a slow release lockout relay employing two coils, either one of which will energize the relay. One of the coils could be used to energize the relay in response to a hold signal. The other coil, used to energize the relay in response to a trip signal, could be connected to a power source through a pair of normally open contacts for the relay such as contacts $LO_1$ shown in the disclosed embodiment. With this arrangement, the second or trip coil would not be energized unless contacts $LO_1$ were closed. Consequently, the relay would not be energized by a trip signal unless immediately preceded by a hold signal, thus precluding false operation from drifts in signal.

I claim as my invention:

1. In combination with a variable frequency signal source, first and second fast drop-out relays, said first relay having first and second pairs of normally open contacts which close when the relay is actuated, said second relay having a pair of normally open contacts which close when the relay is actuated, a slow release lockout relay having first and second pairs of normally open contacts which close when the relay is actuated, means for actuating said first relay to close its contacts when said signal source shifts to a predetermined frequency, means including the first normally open contacts of said lockout relay for actuating said second relay to close its contacts when said signal source shifts to another predetermined frequency, said latter means being adapted to actuate said second relay only when said first contacts of the lockout relay are closed, first circuit means for actuating said lockout relay and including the first and second pairs of normally open contacts of said first relay, said first circuit means being adapted to energize said lockout relay upon closure of said first and second pairs of normally open contacts, and second circuit means for actuating said lockout relay, said second circuit means including the second normally open contacts of said lockout relay and the normally open contacts of said second relay, said second circuit means being adapted to energize the lockout relay upon closure of the second contacts of the lockout relay and the contacts of said second relay.

2. In combination with a source of variable frequency signals, first and second fast drop-out relays, a third relay having a drop-out rate slower than that of said first and second relays, means to energize said first relay when said signal source shifts to a first predetermined frequency, normally open contacts for said first relay which close when the relay is energized, means to energize said third relay when the contacts of said first relay are closed, a pair of normally open contacts for said third relay which close when the relay is energized, means to energize said second relay in response to closure of said contacts of the third relay and a shift in the frequency of said signal source to another predetermined frequency, normally open contacts for said second relay which close when the relay is energized, and means to maintain said third relay energized when the contacts of said second relay are closed.

References Cited in the file of this patent

UNITED STATES PATENTS

| 2,375,229 | Klemperer | May 8, 1945 |
| 2,379,631 | Finckh | July 3, 1945 |
| 2,541,577 | Dornbos | Feb. 13, 1951 |
| 2,580,834 | Prescott | Jan. 1, 1952 |

FOREIGN PATENTS

| 144,569 | Australia | Jan. 3, 1952 |